United States Patent [19]
Aarestad

[11] Patent Number: 4,777,838
[45] Date of Patent: Oct. 18, 1988

[54] SYSTEM FOR LUBRICATING GEAR END FACES

[75] Inventor: Jerome K. Aarestad, Rockford, Ill.

[73] Assignee: Sundstrand Corporation, Rockford, Ill.

[21] Appl. No.: 92,129

[22] Filed: Sep. 2, 1987

[51] Int. Cl.$^4$ .................. F16H 55/08; F16H 57/04; F16C 32/06
[52] U.S. Cl. .................................. 74/468; 74/462; 384/121
[58] Field of Search .................. 74/462, 467, 468; 384/121, 123; 418/77

[56] References Cited
U.S. PATENT DOCUMENTS
2,022,610  11/1935  Wendell ........................... 418/77

FOREIGN PATENT DOCUMENTS
1575548   7/1970   Fed. Rep. of Germany ...... 384/123
2847710   5/1980   Fed. Rep. of Germany ........ 418/77
60-209688 10/1985  Japan ............................... 418/77
602715    4/1978   U.S.S.R. ............................. 74/462

Primary Examiner—Allan D. Herrmann
Attorney, Agent, or Firm—Wood, Dalton, Phillips, Mason & Rowe

[57] ABSTRACT

A micro-contoured surface is formed about a substantial portion of the edge of the end bearing face of each gear tooth of a gear having a plurality of circumferential gear teeth each with an end bearing face for carrying an axial thrust load against a flat housing bearing face or the like. The micro-contoured surface forms a wedge space between the bearing faces which when filled with a fluid establishes a hydro-dynamic film pressure distribution over the entire end bearing face of the gear tooth upon relative motion between the bearing faces.

6 Claims, 2 Drawing Sheets

FIG. 1
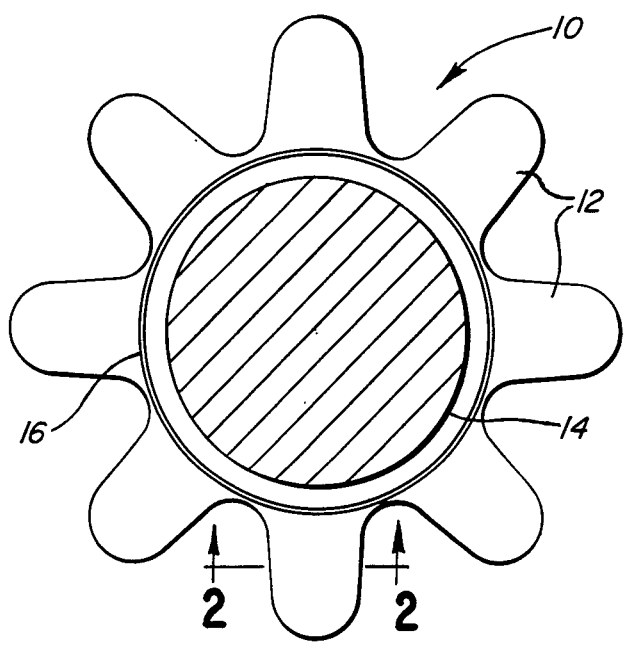
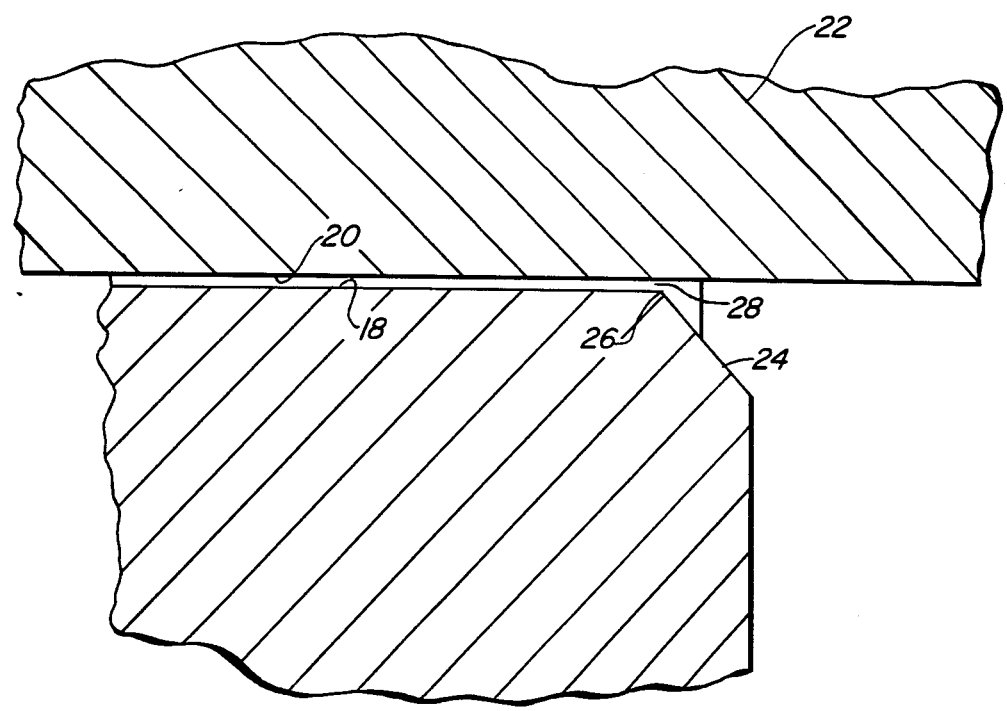
FIG. 2 PRIOR ART

SYSTEM FOR LUBRICATING GEAR END FACES

FIELD OF THE INVENTION

This invention generally relates to the area of gear systems and, particularly, to a means for lubricating the end bearing faces of toothed gears.

BACKGROUND OF THE INVENTION

In many gear systems or gear trains, meshed gear teeth have end bearing faces which abut against smooth flat faces or surfaces of a surrounding structure, such as housing walls forming a gear chamber. The end faces of the gears and the faces of the housing are extremely smooth and flat and encounter thrust loads normal thereto.

Most such gear systems are lubricated by a fluid and it is desirable for the lubricating fluid to enter the spaces between the end bearing faces of the gears and the adjacent flat bearing faces or surfaces of the housing. The fluid is intended to form a hydromechanical fluid bearing film between the faces. However unfortunate, the fluid bearing film tends to be squeezed out in a thrust loading situation where thrust loads are encountered normal to the bearing faces. In addition, the faces often experience smooth metal surface adhesion, sometimes termed "joe-blocking". This is particularly true when the gears are provided with ultra-smooth end bearing faces.

The invention is directed to solving the above problems by providing a micro-contoured surface on the end bearing faces of the gears to facilitate the intrusion of lubricating fluid between the gear and housing surfaces.

SUMMARY OF THE INVENTION

In the exemplary embodiment of the invention, at least one gear is shown to have a plurality of circumferential gear teeth and at least one smooth end bearing face for carrying an axial thrust load against a flat housing bearing face or the like. Means are provided for maintaining a hydromechanical fluid film between the bearing faces.

Specifically, a micro-contoured surface is formed on the end bearing face of each gear tooth about a substantial portion of the edge thereof sufficient to form a wedge space between the gear and housing bearing faces. The wedge space, when filled with a fluid, establishes a hydrodynamic film pressure distribution over the entire end bearing face of the gear tooth upon relative motion between the gear and housing bearing faces.

In the preferred embodiment of the invention, the micro-contoured surface extends from the tip to the root of each gear tooth and, preferably, extends continuously around the root between adjacent gear teeth. The micro-contoured surface extends across approximately 20% of the cordal width of the respective gear tooth. The depth of the micro-contoured surface at the edge of the respective gear tooth, in relation to the end bearing face thereof, is approximately 0.000050 inch.

Other features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is an end elevation of a conventional gear having circumferential gear teeth;

FIG. 2 is a fragmented section, on an enlarged scale, taken generally along line 2—2 of FIG. 1;

DETAILED DESCRIPTION OF THE PREFERRED EMBODIMENT

Figure 3:
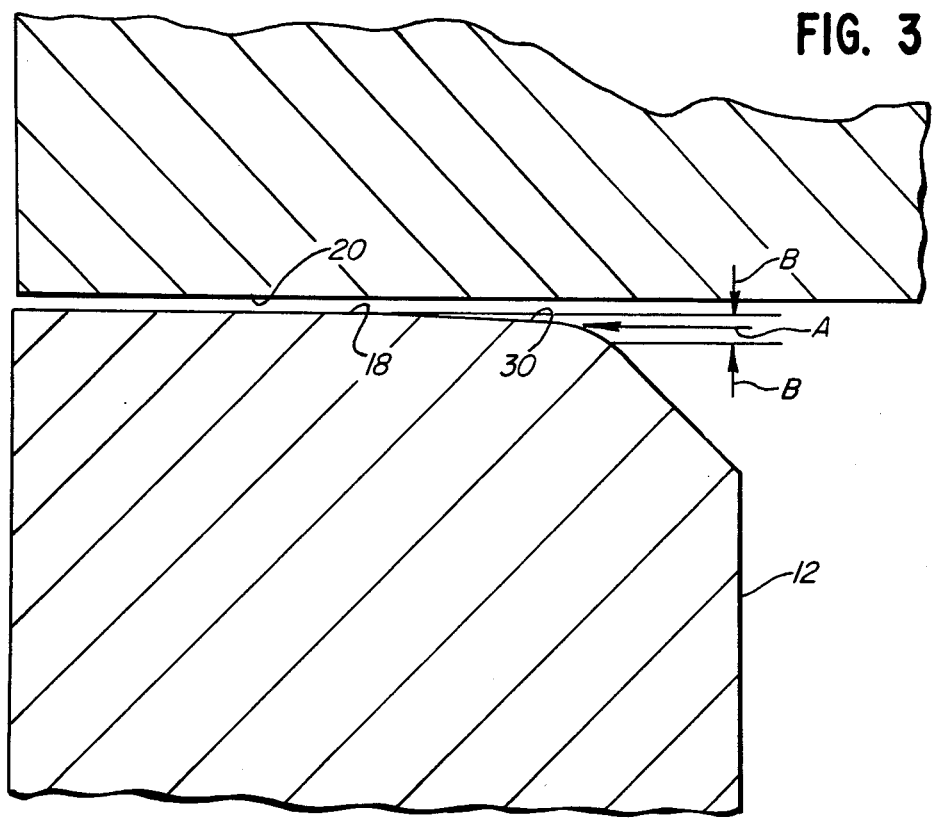
FIG. 3 is a section similar to that of FIG. 2, illustrating the concepts of the invention.

Referring to the drawings in greater detail, and first to FIG. 1, a conventional pinion gear, generally designated 10, is illustrated to include a plurality of gear teeth 12 circumferentially thereabout. The gear is appropriately secured to a shaft 14 which either drives the gear or is driven by the gear. The end faces of gear teeth 12, as shown, in conjunction with the end face of the gear hub 16, form an end bearing face which conventionally abuts or is in close juxtaposition to a complementary flat end face of a housing, or the like. The housing may form a part of a gear chamber within which gear 10 and other meshing gears form an appropriate gear train.

FIG. 2 is a section through one of the gear teeth 12 of a gear of known configuration such that the gear tooth has an end bearing face 18 juxtaposed with a bearing face or surface 20 of a housing 22 or the like. Faces 18 and 20 conventionally are generally parallel about a substantial portion of the areas thereof. In the prior art, a bevel 24 often is formed on the edge of gear tooth 12 to reduce chipping of the tooth during operation. In a typical environment, bearing face 18, which is extremely smooth and flat, encounters a thrust load normal thereto. Due to the flatness of bearing face 18 and the dimensioning of bevel 24, an edge 26 still is formed and, typically, is quite sharp.

As stated heretofore, most gearing systems or gear trains are lubricated with a fluid to not only lubricate the meshed gears but also to provide a lubricant between the gears and surrounding structure, such as housing 22. However, when an opposing gear bearing face 18 engages bearing face 20 of housing 22 in a thrust loading situation, fluid which is intended to form a hydromechanical fluid bearing film between faces 18,20 tends to be squeezed out of this area. A thrust load normal to these bearing surfaces actually can be sufficiently extensive whereby the faces often experience smooth metal surface adhesion, sometimes termed ¢joe-blocking". In essence, notwithstanding bevel 24, fluid access is blocked generally at the point or location identified as 28.

FIG. 3 illustrates the concepts of the invention in relation to the prior art gear configuration of FIG. 2. Generally, the invention contemplates means for maintaining a hydromechanical fluid film between the gear end faces and juxtaposed bearing surfaces. Specifically, a micro-contoured surface 30 is formed on end bearing face 18 of each gear tooth about a substantial portion of the edge thereof. The micro-contoured surface is sufficient to form a wedge space, generally designated by arrow "A", between bearing face 18 and housing bearing face 20. This wedge space, when filled with a fluid, establishes a hydro-dynamic film pressure distribution over the entire end bearing face of the gear tooth upon relative motion between bearing faces 18,20. It has been found effective to form micro-contoured surface 30 at the edge of the respective gear tooth to a depth of approximately 0.000050 inch in relation to end bearing face 18, as indicated by arrows "B".

Figure 4:
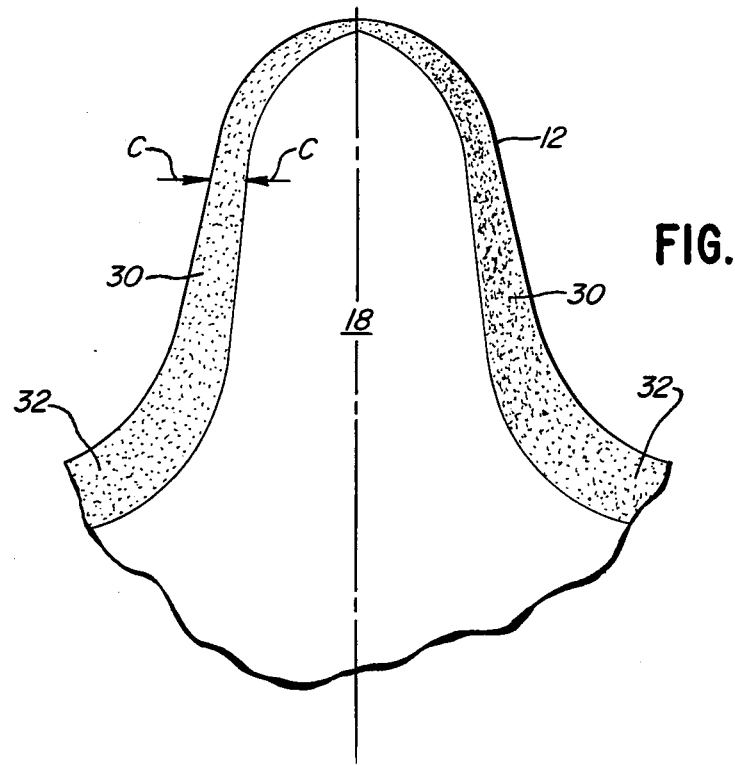
FIG. 4 is an enlarged plan view of the end face of an individual gear tooth embodying the micro-contoured surface of the invention.

FIG. 4 shows further details of micro-contoured surface 30 in relation to the end bearing face 18 of the respective gear tooth 12 and the composite gear 10. Specifically, it is preferred that micro-contoured surface 30 extend from the tip to the root of each gear tooth, as shown, and that the contoured surface extend continuously around the root between adjacent gear teeth, as at 32. Preferably, the width of micro-contoured surface 30, as indicated by arrows "C" extends across approximately 20% of the cordal width of the respective gear tooth at any point along the gear between the tip and the root thereof. Therefore, the micro-contoured surfaces on opposite sides of a gear tooth combine to comprise approximately 40% of the cordal width of the tooth at a given point or location. It can be seen how the micro-contoured surfaces widen as the gear tooth widens toward its root. The above parameters have proven effective to form a wedge space between bearing face 18 and a juxtaposed flat bearing surface which, when filled with a fluid, establishes a hydrodynamic film pressure distribution over the entire end bearing face 18 of the gear tooth upon relative motion between the bearing faces or surfaces.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a gear having a plurality of circumferential gear teeth and at least one smooth end bearing face for carrying an axial thrust load against a flat housing bearing face or the like, means for maintaining a hydromechanical fluid film between said bearing faces comprising a micro-contoured surface formed on the end bearing face of each said gear teeth about a substantial portion of the edge thereof sufficient to form a wedge space between said bearing faces which when filled with a fluid establishes a hydrodynamic film pressure distribution over the entire end bearing face of the gear tooth upon relative motion between said bearing faces, said micro-contoured surface extending continuously around the root between adjacent gear teeth.

2. In a gear having a plurality of circumferential gear teeth and at least one smooth end bearing face for carrying an axial thrust load against a flat housing bearing face or the like, means for maintaining a hydromechanical fluid film between said bearing faces comprising a micro-contoured surface formed on the end bearing face of each said gear teeth about a substantial portion of the edge thereof sufficient to form a wedge space between said bearing faces which when filled with a fluid establishes a hydrodynamic film pressure distribution over the entire end bearing face of the gear tooth upon relative motion between said bearing faces, said micro-contoured surface extending from the tip to the root of each gear tooth and continuously around the root between adjacent gear teeth.

3. In a gear having a plurality of circumferential gear teeth and at least one smooth end bearing face for carrying an axial thrust load against a flat housing bearing face or the like, means for maintaining a hydromechanical fluid film between said bearing faces comprising a micro-contoured surface formed on the end bearing face of each said gear teeth about a substantial portion of the edge thereof sufficient to form a wedge space between said bearing faces which when filled with a fluid establishes a hydrodynamic film pressure distribution over the entire end bearing face of the gear tooth upon relative motion between said bearing faces, said micro-contoured surface extending from the tip to the root of each gear tooth and continuously around the root between adjacent gear teeth and across approximately 20% of the cordal width of the respective gear tooth.

4. In a gear having a plurality of circumferential gear teeth and at least one smooth end bearing face for carrying an axial thrust load against a flat housing bearing face or the like, means for maintaining a hydromechanical fluid film between said bearing faces comprising a micro-contoured surface formed on the end bearing face of each said gear teeth about a substantial portion of the edge thereof sufficient to form a wedge space between said bearing faces which when filled with a fluid establishes a hydrodynamic film pressure distribution over the entire end bearing face of the gear tooth upon relative motion between said bearing faces, said micro-contoured surface extending from the tip to the root of each gear tooth and continuously around the root between adjacent gear teeth, the depth of the micro-contoured surface at the edge of the respective gear tooth in relation to the end bearing face thereof being approximately 0.000050 inch.

5. In a gear having a plurality of circumferential gear teeth and at least one smooth end bearing face for carrying an axial thrust load against a flat housing bearing face or the like, means for maintaining a hydromechanical fluid film between said bearing faces comprising a micro-contoured surface formed on the end bearing face of each said gear teeth about a substatial portion of the edge thereof sufficient to form a wedge space between said bearing faces which when filled with a fluid establishes a hydrodynamic film pressure distribution over the entire end bearing face of the gear tooth upon relative motion between said bearing faces, said micro-contoured surface extending from the tip to the root of each gear tooth, and the depth of said micro-contoured surface at the edge of the respective gear tooth in relation to the end bearing face thereof being approximately 0.000050 inch.

6. In a gear as set forth in claim 5 wherein said micro-contoured surface extends across approximately 20% of the cordal width of the respective gear tooth.

* * * * *

UNITED STATES PATENT AND TRADEMARK OFFICE
CERTIFICATE OF CORRECTION

PATENT NO. : 4,777,838

DATED : Oct. 18, 1988

INVENTOR(S) : Jerome K. Aarestad

It is certified that error appears in the above-identified patent and that said Letters Patent is hereby corrected as shown below:

On the title page

The title heading of the patent document should read "Aarestad et al".

The inventorship line on the face page of the patent document should read: "Jerome K. Aarestad and John G. Schaefer, both of Rockford, Ill."

Signed and Sealed this

Twenty-fifth Day of April, 1989

Attest:

DONALD J. QUIGG

*Attesting Officer*  *Commissioner of Patents and Trademarks*